US010767867B2

(12) United States Patent
Davis et al.

(10) Patent No.: US 10,767,867 B2
(45) Date of Patent: Sep. 8, 2020

(54) BEARING SUPPORT ASSEMBLY

(71) Applicant: UNITED TECHNOLOGIES CORPORATION, Farmington, CT (US)

(72) Inventors: Todd A. Davis, Tolland, CT (US); Christopher M. Valva, Manchester, CT (US); Daniel Rosen, Meriden, CT (US); Armando Amador, Wethersfield, CT (US); Aneil S. Hegde, Vernon, CT (US); Ramin M. Rafatpanah, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 237 days.

(21) Appl. No.: 15/927,285

(22) Filed: Mar. 21, 2018

(65) Prior Publication Data
US 2019/0293293 A1 Sep. 26, 2019

(51) Int. Cl.
*F01D 25/16* (2006.01)
*F23R 3/60* (2006.01)
(Continued)

(52) U.S. Cl.
CPC .............. *F23R 3/60* (2013.01); *F01D 9/065* (2013.01); *F01D 11/003* (2013.01); *F01D 25/162* (2013.01); *F01D 25/164* (2013.01); *F02C 7/28* (2013.01); *F23R 3/002* (2013.01); *F05D 2240/58* (2013.01); *F23R 2900/00012* (2013.01)

(58) Field of Classification Search
CPC .......... F01D 9/06; F01D 9/065; F01D 25/162; F01D 25/164; F01D 11/003; F23R 3/60; F23R 3/002; F23R 2900/00012; F02C 7/28; F05D 2240/58
See application file for complete search history.

(56) References Cited

U.S. PATENT DOCUMENTS 2,620,157 A * 12/1952 Morley ................. F01D 25/162
  415/136
3,312,448 A *  4/1967 Huil, Jr. .................. F16C 33/76
  415/175

(Continued)

FOREIGN PATENT DOCUMENTS

EP  2407640  1/2012
EP  3026222  6/2016

OTHER PUBLICATIONS

European Patent Office, European Search Report dated Apr. 18, 2019 in Application No. 19152848.8.

*Primary Examiner* — David E Sosnowski
*Assistant Examiner* — Wayne A Lambert
(74) *Attorney, Agent, or Firm* — Snell & Wilerm L.L.P.

(57) ABSTRACT

A bearing support may include a central shaft, a flange shaft, and a tube boss. The central shaft may include a central longitudinal axis extending between a first end and a second end of the bearing support. The flange shaft may extend radially outward of the central shaft at an acute angle, relative to the central longitudinal axis from the first end to the second end, and the flange shaft may include a rim defining an aperture. The tube boss extends from the central shaft radially outward through the aperture, according to various embodiments. An annular channel may be between the rim and the tube boss.

17 Claims, 5 Drawing Sheets

(51) Int. Cl.
*F02C 7/28* (2006.01)
*F23R 3/00* (2006.01)
*F01D 11/00* (2006.01)
*F01D 9/06* (2006.01)

(56) References Cited

U.S. PATENT DOCUMENTS

| | | | |
|---|---|---|---|
| 3,572,733 A | 3/1971 | Howald et al. | |
| 4,304,522 A * | 12/1981 | Newland | F01D 25/162 415/135 |
| 4,534,700 A * | 8/1985 | Horler | F01D 25/145 415/135 |
| 4,558,564 A * | 12/1985 | Bouiller | F01D 5/025 415/134 |
| 4,598,600 A * | 7/1986 | Knowles | F01D 25/162 60/798 |
| 4,870,826 A * | 10/1989 | Daguet | F02C 6/08 60/751 |
| 5,160,251 A * | 11/1992 | Ciokajlo | F01D 25/162 415/142 |
| 5,609,467 A * | 3/1997 | Lenhart | F01D 25/162 415/142 |
| 6,099,165 A * | 8/2000 | Tremaine | F01D 25/164 384/535 |
| 6,237,338 B1 * | 5/2001 | Magoshi | F01D 9/06 415/134 |
| 6,422,810 B1 * | 7/2002 | Burdgick | F01D 5/18 415/115 |
| 7,013,634 B2 | 3/2006 | Pidcock et al. | |
| 7,409,831 B2 * | 8/2008 | Lepretre | F01D 25/24 60/751 |
| 8,061,969 B2 * | 11/2011 | Durocher | F01D 9/065 415/69 |
| 8,333,077 B2 | 12/2012 | Lebegue et al. | |
| 8,516,830 B2 | 8/2013 | Duval et al. | |
| 9,234,439 B2 | 1/2016 | Demitraszek, Sr. et al. | |
| 9,689,573 B2 | 6/2017 | Potts et al. | |
| 2003/0005705 A1 * | 1/2003 | Chan | F01D 25/164 60/796 |
| 2008/0050061 A1 * | 2/2008 | Lefebvre | F16C 33/6659 384/474 |
| 2008/0087019 A1 * | 4/2008 | Macquisten | F23M 20/005 60/725 |
| 2009/0079185 A1 * | 3/2009 | Carbines-Evans | F01D 9/065 285/123.1 |
| 2009/0155052 A1 * | 6/2009 | Largillier | F04D 29/644 415/115 |
| 2015/0219015 A1 * | 8/2015 | Szymanski | F02C 7/28 60/796 |
| 2015/0377065 A1 * | 12/2015 | Deane | F01D 9/06 285/15 |
| 2016/0146049 A1 * | 5/2016 | Lemoine | F01D 25/162 415/182.1 |
| 2016/0177764 A1 | 6/2016 | Lemoine | |

\* cited by examiner

BEARING SUPPORT ASSEMBLY

GOVERNMENT LICENSE RIGHTS

This invention was made with Government support under W58RGZ-16-C-0046 awarded by the United States Army. The Government has certain rights in this invention.

FIELD

The present disclosure relates to bearing supports, and more specifically to sealing pass-through ports and mitigating mechanical stresses for bearing supports.

BACKGROUND

A gas turbine engine typically includes a fan section, a compressor section, a combustor section, and a turbine section. As gas turbine engines get smaller and operate at higher temperatures, bearing supports are often subjected to increasing thermal gradients, and these increased thermal gradients may push conventional bearing supports to their structural/design limits. This may be especially true when non-axisymmetric features, such as fluid pass-through ports, are included in traditional bearing supports, because these non-axisymmetric features may result in localized stresses that may adversely affect the structural integrity and/or operational life of the bearing support.

SUMMARY

In various embodiments, the present disclosure provides a bearing support that includes a central shaft, a flange shaft, and a tube boss. The central shaft may include a central longitudinal axis extending between a first end and a second end of the bearing support. The flange shaft may extend radially outward of the central shaft at an acute angle, relative to the central longitudinal axis from the first end to the second end, and the flange shaft may include a rim defining an aperture. The tube boss extends from the central shaft radially outward through the aperture, according to various embodiments. An annular channel may be between the rim and the tube boss.

In various embodiments, a centerline axis of the tube boss is non-parallel (e.g., substantially perpendicular or oblique) to the central longitudinal axis of the central shaft. The tube boss and the annular channel may be concentric about the centerline axis. In various embodiments, the tube boss is a first tube boss, and the rim is a second tube boss. In various embodiments, the second tube boss includes a first side facing the first end of the bearing support. The second tube boss includes a second side facing the second end of the bearing support, according to various embodiments. The first side of the second tube boss may extend from the central shaft and the second side of the second tube boss may be floating relative to the central shaft. For example, a gap may be defined between the second side of the second tube boss and the central shaft. In various embodiments, the gap enables radial deflection of the flange shaft in response to load on the bearing support.

In various embodiments, a first cavity is defined within the central shaft, a second cavity is defined between the central shaft and the flange shaft, and a third cavity is defined radially outward of the flange shaft. The tube boss may be configured to fluidly connect the first cavity to the third cavity. The annular channel may be open to and extend between the second cavity and the third cavity (when the annular sealing member is not installed therein). The annular sealing member may be configured to be disposed within the annular channel to fluidly separate the second cavity from the third cavity.

Also disclosed herein, according to various embodiments, is a gas turbine engine that includes the bearing support described above with the an annular sealing member disposed within the annular channel. In various embodiments, the central longitudinal axis of the central shaft may be the engine central longitudinal axis of the gas turbine engine. In various embodiments, the annular sealing member is a sleeve and a piston ring.

Also disclosed herein is a method of manufacturing a gas turbine engine. The method may include forming a bearing support comprising a central shaft and a flange shaft extending from the central shaft, wherein a tube boss extends from the central shaft through an aperture defined by a rim of the flange shaft. The method may further include positioning an annular sealing member within an annular channel defined between the tube boss and the rim. The annular sealing member may include a sleeve and a piston ring.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
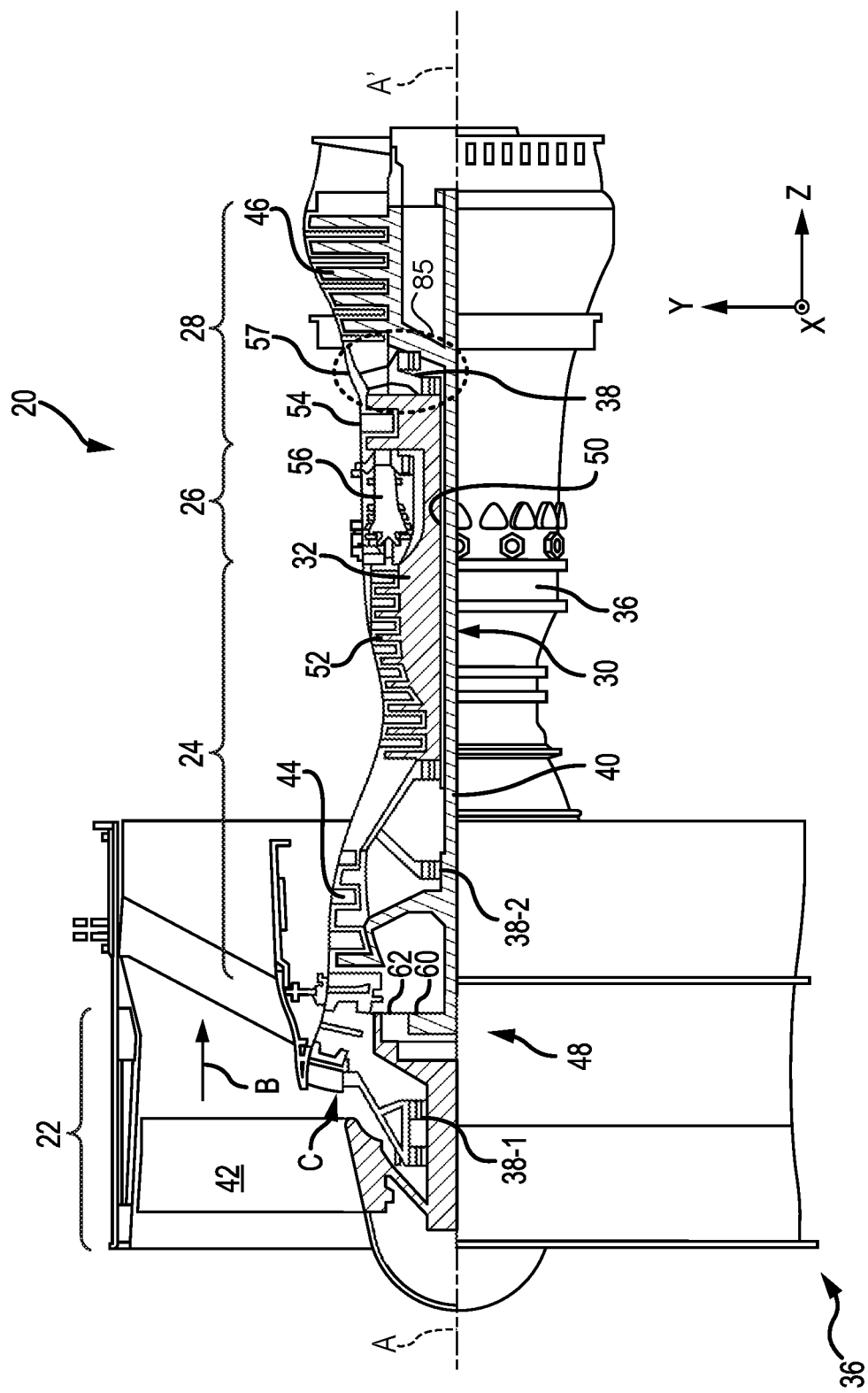
FIG. 1 illustrates a cross-sectional view of a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. The term "axial," as used herein, refers to a direction along or parallel to the engine central longitudinal axis. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component.

Disclosed herein, according to various embodiments, is a bearing support assembly. Generally, the bearing support assembly includes a structural configuration that mitigates thermal stresses (e.g., decreases stress field asymmetry) that may otherwise adversely affect the structural integrity and/or operational life of the bearing support, according to various embodiments. Additionally, the bearing support assembly generally utilizes an annular sealing member that provides adequate fluid sealing without counteracting the aforementioned stress mitigation benefits, according to various embodiments. While numerous details are included herein pertaining to bearing supports of gas turbine engines, the scope of the present disclosure is not so limited. That is, the structure and configuration of the presently disclosed bearing support assembly may be implemented in other applications.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
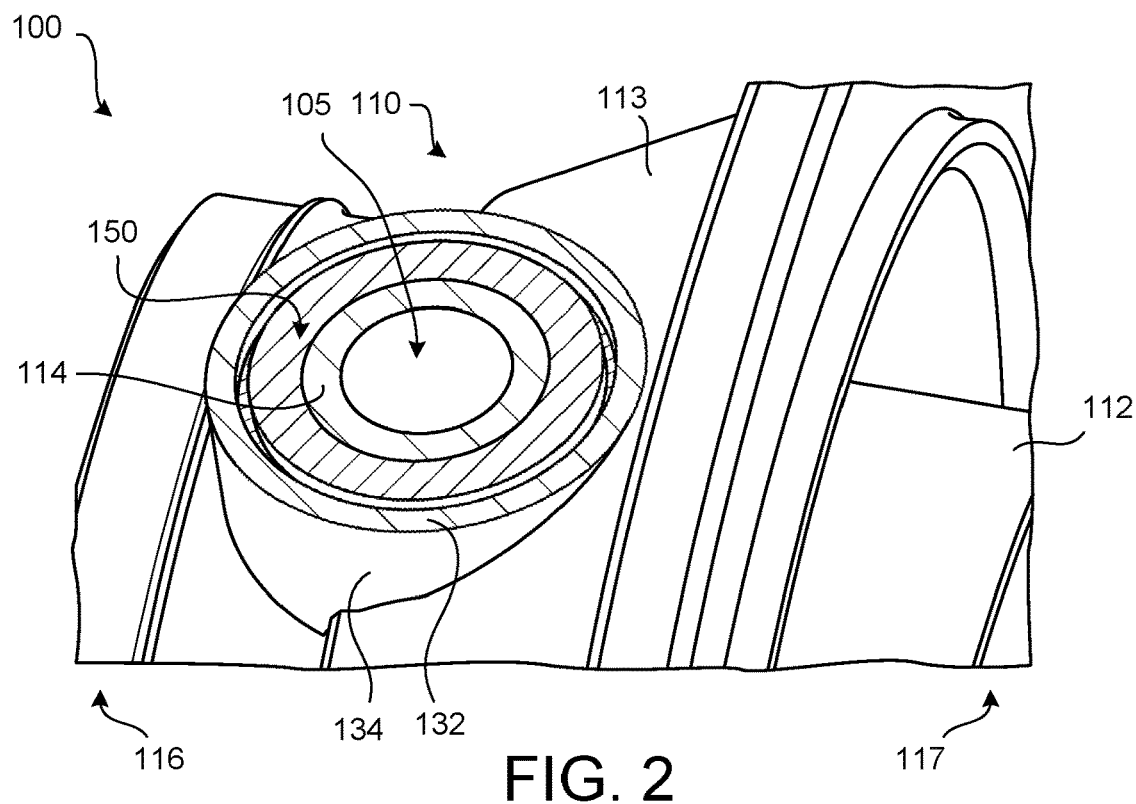
FIG. 2 illustrates a perspective view of a bearing support assembly, in accordance with various embodiments.
Figure 3:
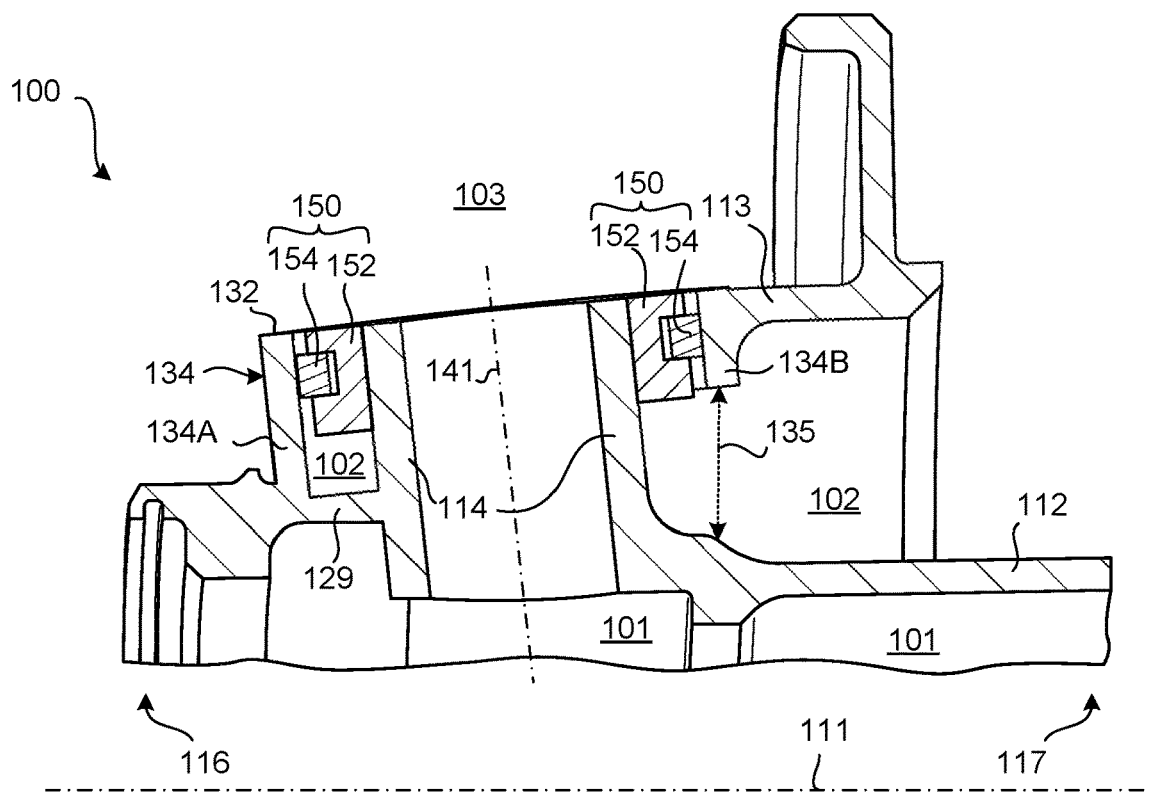
FIG. 3 illustrates a cross-sectional view of a bearing support assembly, in accordance with various embodiments.

In various embodiments, and with reference to FIGS. 2 and 3, a bearing support assembly 100 is provided. The bearing support assembly 100 may be utilized, for example, aft of the combustor section 26 in the turbine section 28 of the gas turbine engine 20, as indicated by area 85 in FIG. 1. The bearing support assembly 100 generally includes a bearing support 110 and an annular sealing member 150. The bearing support 110 includes two shafts—a central shaft 112 and a flange shaft 113—that collectively form a fluid port 105 that experiences reduced thermal stresses when compared with traditional fluid ports on conventional bearing supports, according to various embodiments. In various embodiments, the annular sealing member 150 is disposed in an annular channel around the fluid port 105 to fluidly seal/isolate respective cavities from each other, as described in greater detail below.

In various embodiments, and with continued reference to FIGS. 2 and 3, The central shaft 112 has a central longitudinal axis 111 that extends between a first end 116 and a second end 117 of the bearing support 110, according to various embodiments. The flange shaft 113 extends radially outward of the central shaft 112 at an acute angle (e.g., extends in an angled/oblique orientation), relative to the central longitudinal axis 111 from the first end 116 to the second end 117, according to various embodiments. For example, the flange shaft 113 may have a conical shape. The central longitudinal axis 111 may be the engine central longitudinal axis A-A' of FIG. 1. The flange shaft 113 includes a rim 132 defining an aperture/opening, and a tube boss 114 extends radially outward from the central shaft 112 and passes through the aperture defined by the rim 132, according to various embodiments. The term "tube boss" as used herein refers to a protrusion that has a borehole formed there through. Accordingly, tube boss 114 extends between and enables fluid communication between a first cavity 101 defined within the central shaft 112 and a third cavity 103 disposed radially outward of both the central shaft 112 and the flange shaft 113. A second cavity 102 is defined radially outward of the central shaft 112 but radially inward of the flange shaft 113, according to various embodiments. Accordingly, the tube boss 114 enables fluid transfer between the first cavity 101 and the third cavity 103, but the annular sealing member 150 disposed in the annular channel 136 (with momentary reference to FIG. 4) prevents fluid from flowing between the second cavity 102 and the third cavity 103. The annular sealing member 150, according to various embodiments, includes a sleeve 152 and piston ring 154 configuration. The sleeve 152 and piston ring 154 configuration may be made from metallic materials, such as iron, nickel, titanium, and/or alloys thereof, among other materials.

Figure 4:
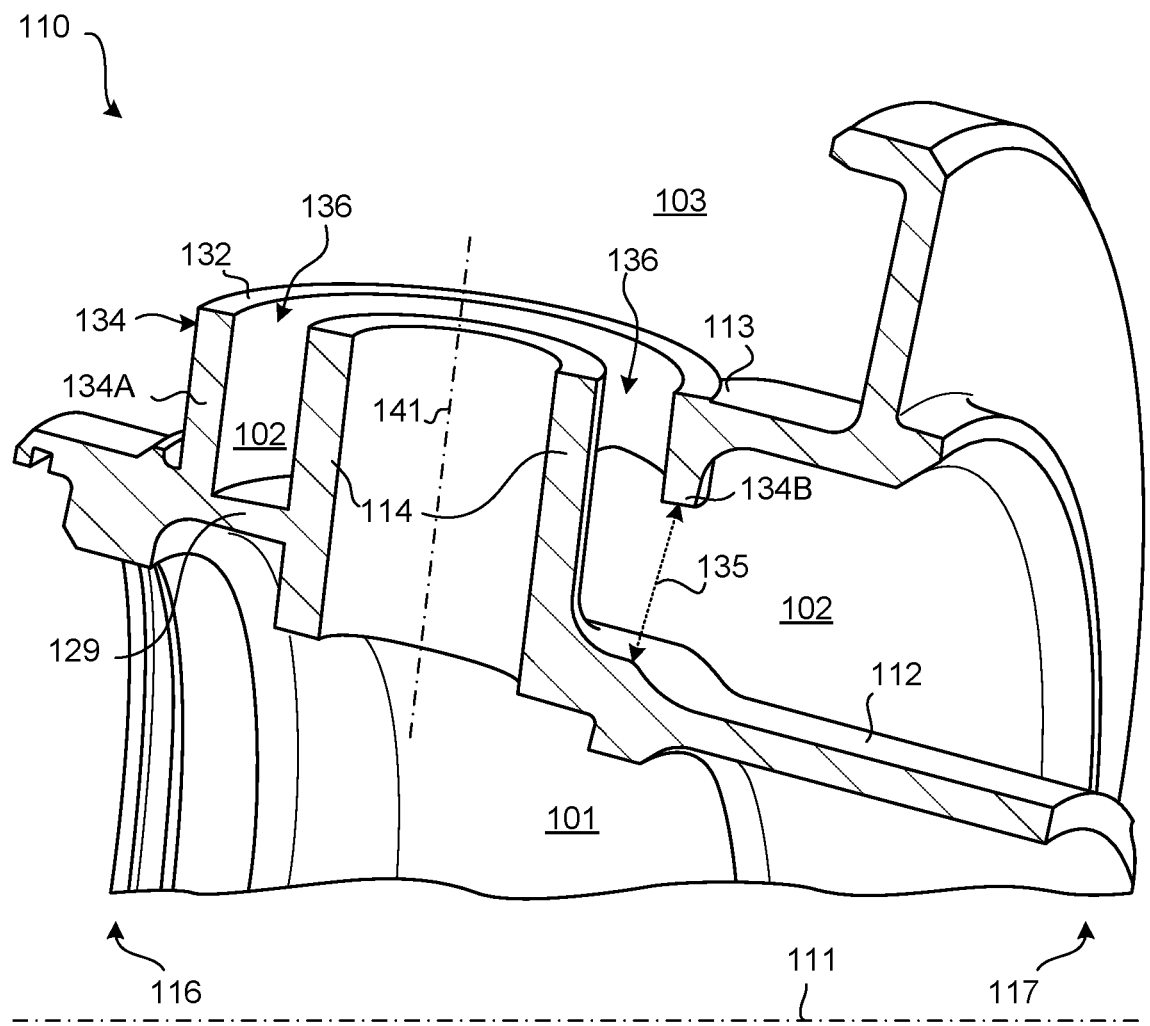
FIG. 4 illustrates a perspective cross-sectional view of a bearing support, in accordance with various embodiments.
Figure 5:
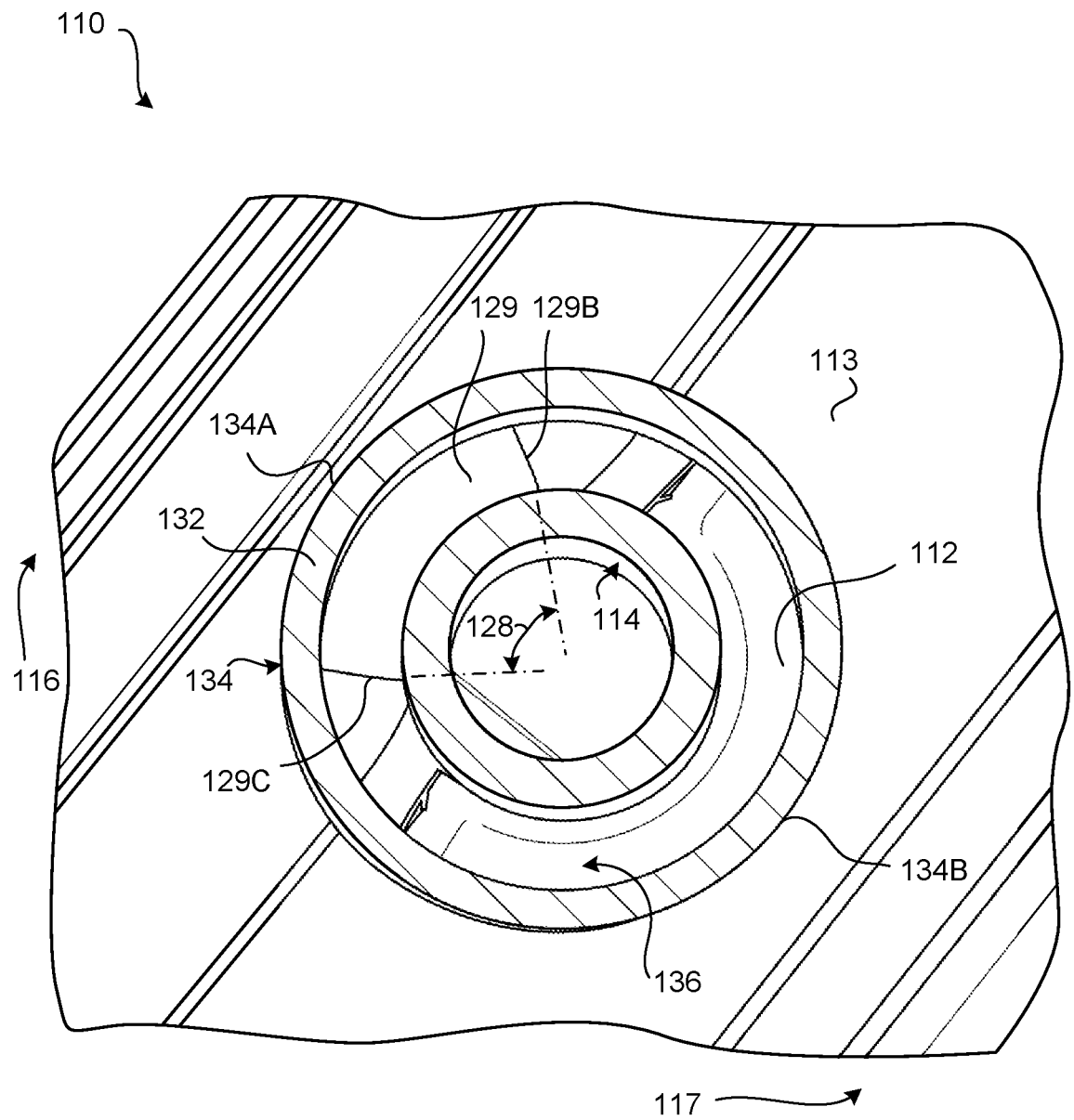
FIG. 5 illustrates a perspective view of a bearing support, in accordance with various embodiments.

FIGS. 2 and 3 show the bearing support assembly 100, which includes both the bearing support 110 and the annular sealing member 150, while FIGS. 4 and 5 show just the bearing support 110 (without the annular sealing member 150 installed). In various embodiments, and with reference to FIGS. 2, 3, and 4, the rim 132 that defines the aperture through which (or at least into which) the tube boss 114 extends may be an orifice or other opening defined in the tapering wall of the flange shaft 113. In various embodiments, the rim 132 is a tube boss. That is, tube boss 114 may be a first tube boss 114 and the rim 132 may be a second tube boss 134. The first tube boss 114 and the second tube boss 134 may be concentric about centerline axis 141, and the annular channel 136 may be defined between the two tube bosses 114, 134. In various embodiments, the centerline axis 141 refers generally to the orientation of the fluid port 105 extending through the flange shaft 113 and into the central shaft 112. In various embodiments, the centerline axis 141 is non-parallel to the central longitudinal axis 111. For example, the centerline axis 141 may be substantially perpendicular to the central longitudinal axis 111, or the centerline axis 141 may be oblique relative to the central longitudinal axis 111.

In various embodiments, the central shaft 112 and the flange shaft 113 may be a unitary, integral structure. The concentric configuration of tube boss 114, 134 may allow for a degree of radial deflection, as described in greater detail immediately below, and/or may otherwise provide stress mitigating benefits. For example, even with the central shaft 112 and the flange shaft 113 being formed of a unitary, integral structure (e.g., being rigidly coupled/mounted to each other), radial deflection is enabled because one side (e.g., a first side 134A) of the second tube boss 134 directly extends from the central shaft 112 (e.g., via connector 129) while the opposite side (e.g., a second side 134B) of the second tube boss 134 is floating relative to the central shaft 112. That is, the second tube boss 134 may have a first side 134A that faces and is generally disposed toward the first end 116 of the bearing support 110 and that directly extends from the central shaft 112 via connector 129. The second tube boss 134 may also have a second side 134B that faces and is generally disposed toward the second end 117 of the bearing support, and a gap 135 may be defined between this second side 134B of the second tube boss 134 and the central shaft 112. Thus, the second side 134B of the second tube boss 134 may only be connected to the central shaft 112 indirectly via the first side 134A of the second tube boss 134. Because this second side 134B of the second tube boss 134 is floating, the flange shaft 113 may experience some radial deflection or may be able to dissipate stresses in response to thermal or mechanical loads experienced by the bearing support 110.

In various embodiments, and with reference to FIG. 5, a view looking into the annular channel 136 from the third cavity 103 (e.g., the radially outward-most cavity) is provided. The annular sealing member 150 is not shown in FIG. 5 in order to clearly show the connector 129 that extends between the first side 134A of the second tube boss 134 and the first tube boss 114. The connector 129 may be a segment of the central shaft 112 or the connector 129 may be considered a portion of the flange shaft 113 that cuts back towards the first tube boss 114 and transitions to the central shaft 112. The arc length of the connector 129, as measured in degrees of angle 128, may be less than 180 degrees. That is, angle 128 represents the span, in degrees, over which the connector 129 extends as it couples the first side 134A of the second tube boss 134 to the first tube boss 114. In various embodiments, the angle 128 is less than 120 degrees. In various embodiments, the angle 128 is between about 120 degrees and about 30 degrees. In various embodiments, the angle 128 is between about 90 degrees and about 45 degrees. As used in this context only, the term "about" means plus or minus 5 degrees.

Figure 6:
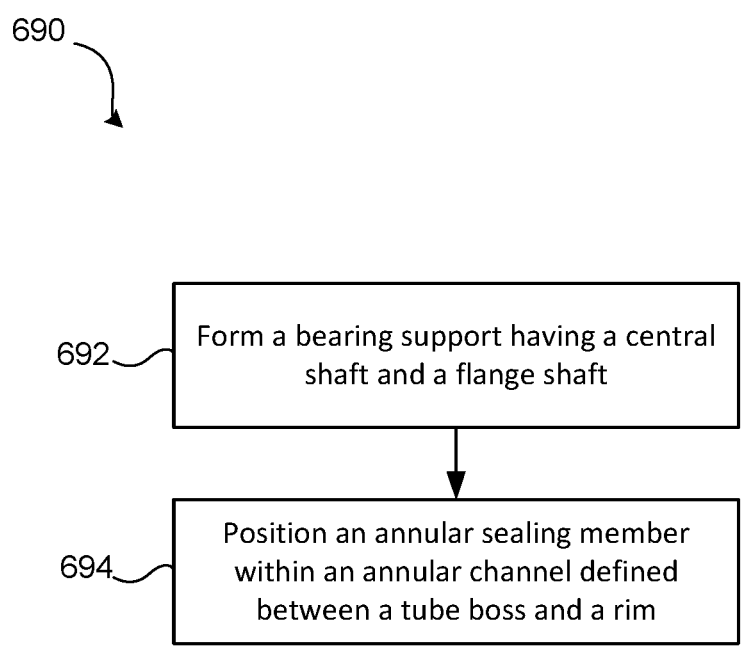
FIG. 6 is a schematic flow chart diagram of a method of manufacturing a gas turbine engine, in accordance with various embodiments.

In various embodiments, and with reference to FIG. 6, a method 690 of manufacturing a gas turbine engine is provided. The method 690 includes forming the bearing support 110 having the central shaft 112 and the flange shaft 113 at step 692, according to various embodiments. The method 690 may further include positioning the annular sealing member 150 within the annular channel 136 defined between the tube boss 114 and the rim 132 at step 694. Step 692 may include casting and/or machining, among other techniques.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bearing support comprising:
a central shaft comprising a central longitudinal axis extending between a first end and a second end of the bearing support;
a flange shaft extending radially outward of the central shaft at an acute angle, relative to the central longitudinal axis from the first end to the second end, wherein the flange shaft comprises a rim defining an aperture; and
a tube boss extending from the central shaft radially outward through the aperture, wherein an annular channel is defined between the rim and the tube boss;
wherein:
the rim comprises a first side disposed toward and facing the first end of the bearing support;
the rim comprises a second side disposed toward and facing the second end of the bearing support;
the first side of the rim extends directly from the central shaft via a connector segment; and
the second side of the rim is floating relative to the central shaft such that a gap is defined between the second side and the central shaft.

2. The bearing support of claim 1, wherein the central shaft and the flange shaft together form a unitary, integral structure.

3. The bearing support of claim 1, wherein the tube boss comprises a centerline axis, wherein the tube boss and the annular channel are concentric about the centerline axis.

4. The bearing support of claim 1, wherein the tube boss is a first tube boss, wherein the rim is a second tube boss.

5. The bearing support of claim 4, wherein:
the second tube boss comprises the first side facing the first end of the bearing support;
the second tube boss comprises the second side facing the second end of the bearing support;
the first side of the second tube boss extends from the central shaft; and
the second side of the second tube boss is floating relative to the central shaft.

6. The bearing support of claim 1, wherein the gap enables radial deflection of the flange shaft in response to load on the bearing support.

7. The bearing support of claim 1, wherein:
a first cavity is defined within the central shaft;
a second cavity is defined between the central shaft and the flange shaft; and
a third cavity is defined radially outward of the flange shaft.

8. The bearing support of claim 7, wherein the tube boss is configured to fluidly connect the first cavity to the third cavity.

9. The bearing support of claim 8, wherein the annular channel is open to and extends between the second cavity and the third cavity.

10. The bearing support of claim 9, wherein an annular sealing member is configured to be disposed within the annular channel to fluidly separate the second cavity from the third cavity.

11. A gas turbine engine comprising:
a bearing support comprising:
a central shaft extending around and along an engine central longitudinal axis of the gas turbine engine, wherein the bearing support comprises a first end and a second end;
a flange shaft extending radially outward of the central shaft at an acute angle, relative to the engine central longitudinal axis from the first end to the second end, wherein the flange shaft comprises a rim defining an aperture; and
a tube boss extending from the central shaft radially outward through the aperture, wherein an annular channel is defined between the rim and the tube boss; and an annular sealing member disposed within the annular channel;

wherein one side of the rim is directly connected to the central shaft and an opposing side of the rim is floating relative to the central shaft such that a gap is defined between the opposing side and the central shaft.

12. The gas turbine engine of claim 11, wherein the annular sealing member comprises a sleeve and a piston ring.

13. The bearing support of claim 11, wherein:
a first cavity is defined within the central shaft;
a second cavity is defined between the central shaft and the flange shaft;
a third cavity is defined radially outward of the flange shaft;
the tube boss is configured to fluidly connect the first cavity to the third cavity; and
the annular sealing member is configured to fluidly separate the second cavity from the third cavity.

14. The gas turbine engine of claim 11, wherein the tube boss comprises a centerline axis, wherein the tube boss and the annular channel are concentric about the centerline axis.

15. The gas turbine engine of claim 14, wherein the tube boss is a first tube boss, wherein the rim is a second tube boss.

16. The gas turbine engine of claim 15, wherein:
the second tube boss comprises the one side facing the first end of the bearing support; and
the second tube boss comprises the opposing side facing the second end of the bearing support.

17. The gas turbine engine of claim 16, wherein the central shaft and the flange shaft together form a unitary, integral structure.

* * * * *